United States Patent [19]
Isohata

[11] Patent Number: 5,804,241
[45] Date of Patent: Sep. 8, 1998

[54] LIQUID-ABSORBENT SHEET AND METHOD FOR STORING FOOD USING THE SAME

[75] Inventor: Toru Isohata, Kanagawa, Japan

[73] Assignee: Showa Denko K.K., Tokyo, Japan

[21] Appl. No.: 609,625

[22] Filed: Mar. 1, 1996

Related U.S. Application Data

[62] Division of Ser. No. 385,131, Feb. 7, 1995, abandoned.

[30] Foreign Application Priority Data

Feb. 7, 1994 [JP] Japan .................................. 6-13862

[51] Int. Cl.$^6$ ....................................................... B65B 55/00
[52] U.S. Cl. .......................... 426/415; 426/124; 426/410
[58] Field of Search ...................... 426/124, 129, 426/410, 415; 428/304.4

[56] References Cited

U.S. PATENT DOCUMENTS

| | | | |
|---|---|---|---|
| 4,382,507 | 5/1983 | Miller | 426/124 |
| 4,645,698 | 2/1987 | Matsubara | 428/68 |
| 5,022,945 | 6/1991 | Rhodes et al. | 426/129 |
| 5,250,310 | 10/1993 | Fujino et al. | 426/124 |
| 5,320,895 | 6/1994 | Larsonneur et al. | 428/137 |
| 5,552,169 | 9/1996 | Kannankeril et al. | 426/124 |

FOREIGN PATENT DOCUMENTS

| | | |
|---|---|---|
| A0320314 | 6/1989 | European Pat. Off. . |
| A0359897 | 3/1990 | European Pat. Off. . |
| A-2665890 | 2/1992 | France . |
| WO 90/03320 | 4/1990 | WIPO . |

*Primary Examiner*—John Kim
*Attorney, Agent, or Firm*—Sughrue, Mion, Zinn, Macpeak & Seas, PLLC

[57] ABSTRACT

A liquid-absorbent sheet containing a liquid-absorbing material capable of absorbing drips of food, wherein a part of the outer surface of the liquid-absorbent sheet is composed of a liquid-permeable film, a part of other outer surface thereof is composed of a liquid-semipermeable film, the liquid-semipermeable film is a liquid-impermeable film having formed therein pores, the diameter of the pore is in the range of from 0.05 mm to 0.5 mm, and the porosity of the pores is in the range of from 0.01% to 0.4%. The liquid-absorbent sheet effectively absorbs drips oozing from a drippy food to prevent deterioration in qualities of the food for a prolonged period of time.

6 Claims, 1 Drawing Sheet

LIQUID-ABSORBENT SHEET AND METHOD FOR STORING FOOD USING THE SAME

This is a divisional of application Ser. No. 08/385,131 filed Feb. 7, 1995, abandoned.

FIELD OF THE INVENTION

The present invention relates to a liquid-absorbent sheet capable of absorbing off drips oozing from the surfaces of a drippy food such as meat and fish, and capable of preventing deterioration in qualities of the food for a long period of time without drying the food by positively not absorbing water in the food, and also to a method for storing a food using the liquid-absorbent sheet.

BACKGROUND OF THE INVENTION

When a food such as meat or fish is vacuum-packaged in a gas-impermeable bag and stored at a chilled temperature or stored in a frozen state and then thawed, a liquid called "drips" oozes from the food. These drips are pooled in a space between the food and the gas-impermeable bag. When the food comes in contact with these drips, it undergoes deterioration (for example, discoloration) in the qualities and thus its commercial value is seriously reduced. On the other hand, the elimination of the discolored part lowers the yield of the food. Furthermore, the drips suit for the growth of bacteria, resulting in a shortened shelf life of the food.

Therefore, attempts-have been made to develop a method for eliminating the drips from a food. The method generally comprises packaging a food while being in contact with a liquid-absorbent material in the form of a sheet which absorbs drips oozing from the food during storage. The liquid-absorbent materials that have been employed for the purpose are capillary liquid-absorbent materials such as paper pulp having a hydrophilic surface and capable of absorbing and retaining drips via the capillary action; so-called polymeric water absorbents; and composite materials consisting thereof. However, these capillary liquid-absorbent materials are poor in strength as a sheet material. The polymeric water absorbents are generally in the form of a powder or granules and are troublesome when they are brought into contact with a food. Accordingly, these liquid-absorbent materials are covered with a liquid-permeable film such as a nonwoven fabric and used as a liquid-absorbent sheet, as described in JP-B-1-12539 and JP-B-6-53226. (the term "JP-B" as used herein means an "examined Japanese patent publication")

The liquid-absorbent sheet covers a large part of food surface or is placed under the bottom surface of food in the case of vacuum packaging the food with a gas-impermeable film, being chilled and transported. This is because even the food is vacuum packaged with a gas-impermeable sheet, the drip oozing from the food due to gravity and shake during transporting stays at bottom portions of the packages and hollow portions of the food. By placing the liquid-absorbent sheet at the above-mentioned positions so that the drip is absorbed in the liquid-absorbent sheet, which is the most important purpose of the liquid-absorbent sheet, the food can be kept away from the drip.

However, when a part of the outer surface of the liquid-absorbent sheet is composed of a liquid-permeable film and the liquid-permeable film is contacted with the food, the liquid-absorbent sheet positively absorbs not only the drip staying in the space between the food and the gas-impermeable film but also water in the food at the surface thereof in contact with the liquid-absorbent sheet and as a result the food is dried and the quality is deteriorated.

Also, when a part of the liquid-absorbent sheet is composed of a liquid-impermeable film and the the liquid-impermeable film portion is brought into contact with food, as described, in JP-B-5-83214, the liquid-absorbent sheet cannot absorb the drip oozing from the food at the contct surfaces, in particular, in the case that the liquid impermeable film is disposed at hollow portions of the food or under the bottom portions of the food. The food is kept contacted with the drip for a prolonged time and thus the absorption of drip cannot be attained sufficiently.

SUMMARY OF THE INVENTION

The present invention has been made for solving the foregoing problems and thus, the first object of the present invention is to provide a liquid-absorbent sheet which absorbs the drip oozing from food such as meat and fish, and the drip staying at the bottom portions and the hollow portions of the food in contact with the liquid-absorbent sheet but not positively absorbing water from the food, whereby the food itself is not dried and discloration and deterioration in qualities of the food can be prevented for a prolonged time, so that a good yield can be attained. The second object of the present invention is to provide a method for storing a drippy food using the liquid-absorbent sheet.

The first object can be attained by providing a liquid-absorbent sheet having included therein a liquid-absorbent material for absorbing drips oozing from foods, wherein a part of the outer face of the liquid-absorbent sheet comprises a liquid-permeable film, at least another part of the outer face thereof comprises a liquid-semipermeable film, and the liquid-semipermeable film is a perforated liquid-impermeable film having pores of a diameter falling within a range of from 0.05 mm to 0.5 mm, and a porosity falling within a range of from 0.01% to 0.4%.

The second object can be attained by a method for storing a drippy food, which camprises contacting the food with the liquid-semipermeable film of the liquid-absorbent sheet and storing the food by vacuum packaging the food with a gas impermeable film.

DETAILED DESCRIPTION OF THE INVENTION

Figure 1:
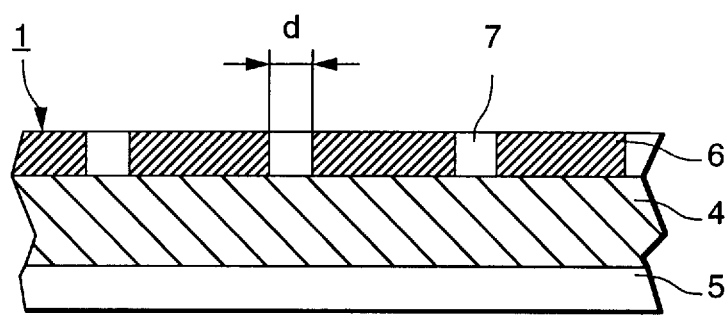
FIG. 1 is a sectional view of a liquid-absorbent sheet of the present invention.

The liquid-semipermeable sheet used in the liquid-absorbent sheet of the present invention is not a liquid-impermeable sheet permeating no water but is a sheet permeating a small amount of water in a restrained state, and it is practically a liquid-impermeable film as a packaging film for foods but having provided therein pores defined according to the present invention.

Examples of the liquid-impermeable film include a polyethylene film, a polypropylene film, a polyvinylidene chloride film, a polyethylene terephthalate (PET) film, a humidity-proofing cellophane, and a polyethylene-laminated aluminum foil. Of these films, a polyethylene film and a polypropylene film are particularly preferred since these films do not contain or generate substances which may contaminate foods, do not have a water-absorbing property and a water permeability by themselves, are flexible, have a good releasing property from the foods to which the film is press-stuck, and also are inexpensive.

The liquid semipermeable film as used in the present invention is produced by perforating a liquid-impermeable film such that the diameter d of the pores of the liquid-semipermeable film is in the range of from 0.05 mm to 0.5 mm, and preferably from 0.1 mm to 0.3 mm and the porosity P thereof is in the range of from 0.01% to 0.4%, and preferably from 0.01% to 0.2%. It is preferred that the pores are uniformly distributed over the whole liquid-semipermeable film. Also, there is no restriction on the form of the pores if the diameter and the porosity are in the ranges described above.

The porosity is the % value shown by A/B×100, wherein A is the total area of the pores and B is the whole area (including the areas of the pores) of the liquid-semipermeable film, and when the area j of each pore is the same, the porosity is shown by (s×n×100)/B, wherein n is the number of the pores.

It is preferred that the food is brought into contact with the surface of the liquid-semipermeable film of the liquid-absorbent sheet and the food is preserved by vacuum packaging with a gas-impermeable film. The pores are for introducing the drip oozing from the food in contact with the liquid-semipermeable film into the inside of the liquid-absorbent sheet through the pores, and for the purpose the diameter d of the pores is effective in the range of from 0.05 mm to 0.5 mm.

As the result of experiments, it has been found that when the diameter d of the pores is less than 0.05 mm, the drip oozing from the food remain on the liquid-semipermeable film without being passed through the pores. When the drip is allowed to be in contact with a food such as meat for a long time, the contact surface of the meat is discolored into black. Also, when the diameter of the pores is over 0.5 mm, the drip and water in the meat are absorbed by the liquid-absorbent sheet and blackening which is considered to be the concentration of pigments occurs only at the portions in contact with the pore portions of the liquid-semipermeable film to thereby cause spots on the surface of the meat. On the other hand, the porosity is too large, the interval between each pores is narrowed, so that water and pigments of the meats are wholly absorbed by the liquid-absorbent sheet, and the meat is wholly thinned. Thus, both the cases are inconvenient.

When the diameter of the pores becomes large, occurrence of discoloration at the portions of the pores becomes significant. Further, it is difficult to uniformly provide the pores having a large diameter in production of the liquid semipermeable film. For the reasons, the optimum diameter d of the pores, which absorb quickly the drips oozing from meat during the storage and which do not absorb water in meat, is in the range of from 0.1 mm to 0.3 mm.

It has been found that the porosity E is effective in the range of from 0.01% to 0.4%. If the porosity p is less than 0.01%, the intervals among the pores becomes large and hence the drip is not effectively absorbed in the liquid-abosorption sheet through the pores, so that the drip is allowed to be in contact with the food such as meat for a long time to blacken the surface of meat. When the diameter of the pores becomes larger, water in the meat at the peripheral portions of the pores is absorbed through the pores and blackening, which is considered to be due to concentration of pigments, occurs only at the portions to cause spots on the surface of meat.

Also, if the porosity P is over 0.4%, the intervals among the pores become narrow, whereby not only the drip but also water in the inside of meat are absrobed to thin the meat. The increase of the porosity means that the area of the pores becomes large and the absorbed amount of water with the liquid-absorbent sheet is increased. Thus, in view of increasing the yield, the optimum porosity P is in the range of from 0.01% to 0.2%.

The liquid-semipermeable film can be produced by perforating the foregoing liquid-impermeable film by a known mechanicl or electric means or with the use of laser, etc.

The liquid-permeable film as used in the present invention may be arbitrarily selected from generally available films which have a water permeability and water resistance, have such a density (pore size) as to prevent leakage of powdery polymeric water absorbent if used in the liquid-absorbent sheet, preferably have heat sealing properties and is acceptable for packaging foods. Examples of the liquid-permeable film include woven fabrics, knitted fabrics and nonwoven fabrics or laminates thereof. A liquid-impermeable film (e.g., a polyethylene film, a polypropylene film, a PET film, or a moistureproof cellophane) in which fine penetrating holes have been formed through the film by a known mechanical or electrical means or with the use of laser, a foamed polyethylene sheet having fine penetrating holes or a mesh sheet may also be used as the liquid-permeable film. In general, these films have a porosity of 1% or above and are thus clearly distinguishable from the above-mentioned liquid-semipermeable film. The liquid-permeable film preferably has a porosity of about 10%. The liquid-permeable film preferably has a thickness of from 0.02 mm to 0.05 mm.

The liquid-permeable film is used for quickly permeating and absorbing drips which ooze from the surface of food not in contact with the liquid-absorbent sheet and flow to the water absorption sheet by gravity, and shake during transporting of the food.

It is preferred that the liquid-semipermeable film and the liquid-permeable film have a heat-sealing property and each film constitutes each surface of the liquid-absorbent sheet of this invention.

By heat-sealing the peripheral portions of both the films, the peeling of the layers of the liquid-absorbent sheet can be prevented and also leakage of a liquid-absorbing material contained in the liquid-absorbent sheet can be prevented.

The liquid-absorbing material is used for absorbing and keeping therein the drips oozing from food, and any liquid-absorbing materials which do not give adverse inlfuences on the human bodies can be used in the present invention.

A polymeric water absorbent may be contained in the liquid-absorbent material and may be arbitrarily selected from known materials which are capable of absorbing drips and has a satisfactory safety. A number of materials which generally have a three-dimensionaly crosslinked structure are known as a polymeric water absorbent. Preferable examples include crosslinked products of polymers prepared by graft polymerizing a polysaccharide (e.g., starch or cellulose) with one or more substances selected from the group consisting of acrylic acid, methacrylic acid, acrylic acid salts, methacrylic acid salts, acrylic acid esters, methacrylic acid esters, acrylamides, methacrylamides, acrylonitrile, methacrylonitrile, maleic acid, sulfonated styrene, polyvinyl pyridine, and oligomers or cooligomers thereof, optionally followed by hydrolysis; crosslinked products of one or more substances selected from the group consisting of polyethylene oxide, polypropylene oxide, polyvinyl pyrrolidone, sulfonated polyethylene, polyvinyl pyridine, polyacrylic acid salts, polymethacrylic acid salts, polyacrylamide and polymethacrylamide; vinyl acetate/acrylic acid salt copolymer; isobutylene/maleic anhydride copolymer; polyvinyl alcohol/maleic acid copolymer; and crosslinked carboxymethylcellulose. Examples of commercially available polymeric water absorbents include PX-402A (a product of Showa Denko K.K.), Sunwet IM-300 (a product of Sanyo Chemical Industries, Ltd.), Aquakeep 10SH (a product of Seitetsu Kagaku Kogyo K.K.) and Aqualic CA (a product of Nippon Shokubai Kagaku Kogyo Co., Ltd.) may be cited.

It is preferred that the foregoing liquid-absorbing material is composed of the foregoing polymeric water absorbent sandwiched in capillary liquid-absorbing materials capable of absorbing a liquid by a capillarity.

The capillary liquid-absorbing material is a sheet-form material absorbing drips or water by a capillarity and can keep them therein and preferably contains the foregoing polymeric water absorbent. More preferably, the capillary liquid-absorbing material furhter contains a wetting agent as will be described later. As examples of the capillary liquid-absorbing material, there are a paper, a pulp, a pulp-forming sheet, an absorbent cotton, a gauze, a fabric, a knitted cloth, a nonwoven fabric, a sponge, continuous cell type polyurethane foam, a continuous cell type viscose foam, and a continuous cell type vinylon foam. A preferred thickness of the liquid-absorbent material varies depending upon the kind of the liquid-absorbent material. For example, the thickness is generally from about 0.03 mm to about 0.1 mm when gauze or nonwoven fabric is used, and it is generally from about 1 mm to about 10 mm when pulp, absorbent wadding or sponze is used. An absorbent wadding of 10 mm in thickness is preferably used for the purpose.

The polymeric water absorbent is generally a powder or a granular form in a dried state and thus for incorporating the polymeric water absorbent in the liquid-absorbent sheet, the polymeric water absorbent may be scattered in a layer formed between two layers of the capillary liquid-absorbing material and is kept between the two layers or may be inserted and kept in the insides of the continuous cells of the capillary liquid-absorbing material constituting one layer. Also, a commercially available product keeping a polymeric water absorbent in the capillary liquid-absorbing material, such as, for example, a paper diaper, a sanitary napkin, and a high water absorbing sheet which is used in the fields of soil improving agents, etc., can be used as the liquid-absorbing material.

The polymeric water absorbent non-reversibly absorbs a large amount of drips and water introduced through the pores of the liquid-semipermeable film and the fine continuous holes of the liquid-permeable film, and further passed through the layer of the capillary liquid-absorbing material, and does not flow backward even when a pressure or an impact is applied thereto.

It is preferred that the liquid-absorbing material of the present invention contains a wetting agent. In general, a polymeric water absorbent is hard in a dried state and hence in the case of such a polymeric water absorbent, there is a possibility of damaging the exterior packaging film and the gas-impermeable film for vacuum packaging by friction, etc. On the other hand, since a wetting agent keeps the softness even in the dried state, the occurrence of such damaging is prevented and, for example, the pinholing ratio of the gas-impermeable film can be lowered. Also, when the foregoing capillary liquid-absorbing material has a hydrophobic surface, the initial water absorption is generally not sufficient. However, when in this case, the hydrophobic surface is covered by a wetting agent, the initial water absorption is improved and the drips and water introduced from the pores of the liquid-semipermeable film and the fine continuous holes of the liquid-permeable film can be quickly absorbed.

The amount of the wetting agent to be used is not particularly limited, as long as it can make the liquid-absorbent material flexible without undergoing leakage even under elevated pressure. The optimum amount of the wetting agent can be experimentally determined by taking account of the kind, constitution and total capillary wall area of the employed liquid-absorbent material.

Examples of the wetting agent include polyhydric alcohols such as ethylene glycol, propylene glycol, diethylene glycol monoethyl ether, 1,3-butylene glycol and glycerol; polyhydric alcohol polymers such as polyethylene glycol, polypropylene glycol and polyglycerol; sugar alcohols such as xylitol, sorbitol and maltitol; and methylcellulose and carboxymethylcellulose. If necessary, these wetting agents may be used in the form of an aqueous solution. Among all, glycerol is particularly preferable from the viewpoints of wetting ability and safety.

When the liquid-absorbent sheet of the present invention is brought into contact with a food such that the surface of the liquid-semipermeable film is in contact with the food, and the food is vaccum packaged with a gas-impermeable film to store, the drip oozing from portions of the food, which are not in contact with the liquid-absorbent sheet, move through the gap between the foods and the gas impermeable film by gravity or upon being shaken during transport. Thus the drip is adsorbed off with the liquid absorbing material of the liquid-absorbent sheet through the surface of the liquid-permeable film of the liquid-absorbent sheet disposed at the bottom or at the bottom and upper portions of of the food. Also, the drip oozing from the surfaces of the food in contact with the liquid-absorbent sheet is absorbed by the liquid-absorbent sheet through the pores of the liquid-semipermeable sheet surface.

Furthermore, when hollow portions of the food wherein the drip is liable to stay is contacted with the liquid-absorbent sheet, the drip oozing from the food is absorbed by the liquid-absorbent sheet through the pores of the liquid-semipermeable film surface, whereby the food is not brought into contact with the drip for a long time.

On the other hand, when the surface of the liquid-semipermeable film having the pores of the diameter and the porosity described above is in contact with the food, water in the food is not positively absorbed by the liquid-absorbing material, whereby the deterioration in quality and discoloration of the food due to drying do not occur.

When the liquid-absorbing material included in the liquid-absorbent sheet contains the polymeric water absorbent, the drip once absorbed is not released to the food side even when applied to the liquid absorbing material a pressure or an impact during the storage or the transportation of foods.

When the liquid-absorbing material contains a wetting agent, the liquid-absorbing material is softened and the pinholing ratio of the gas-impermeable film used for vacuum packaging is lowered.

Then, the present invention is explained by referring to the accompanied drawings.

FIG. 1 shows a preferred example of the liquid-absorbent sheet of the present invention.

In the practical example shown in FIG. 1, a liquid-absorbent sheet 1 contains a liquid-absorbing material 4 for absorbing drips of food, one of the external surfaces of the liquid-absorbing material 4 is composed of a liquid-permeable film 5, and the other external surface is composed of a liquid-semipermeable film 6. The liquid-semipermeable film 6 is composed of a liquid-impermeable film such as, preferably, a polyethylene film or a polypropylene film, having formed therein pores, and the pores have the specific diameter and the specific porosity as described above.

Figure 2:
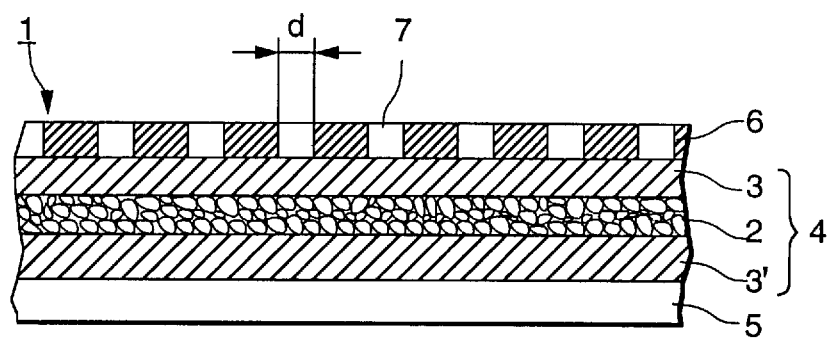
FIG. 2 is a sectional view of another liquid-absorbent sheet of the present invention.

It is preferred that the liquid-absorbing material 4 is formed in a sheet form by sandwiching a sheet-form polymeric water absorbent 2 with capillary liquid-absorbing materials 3 and 3' as shown in FIG. 2 and further it is preferred that the liquid-absorbing material 4 contains a wetting agent.

It is also preferred that the liquid-semipermeable film 6 and the liquid-permeable film 5 have a heat-sealing peroperty and both the films are heat-sealed at the peripheral portions.

For preserving a drippy food such as meat, fish, fish meat, etc., using the liquid-absorbent sheet 1 of the present invention, the food is placed on the liquid-absorbent sheet 1 in the state that the food is brought into contact with the liquid-semipermeable film 6 and at least a part of the liquid-absorbent sheet is disposed at the bottoms of the food during transportation or preservation of the food and the food is vacuum packaged with a gas-impermeable film.

In this case, the gas-impermeable film used may be an ordinary gas-impermeable film, a shrunk film, etc., generally used for vacuum packaging of food. Also, in this case, the vacuum degree may be such an extent that the food is closely contacted with the liquid-absorbent sheet 1 and the gas-impermeable film.

During the sotrage of food such as, for example, frozen meants, partial meats, etc., of beef, pork, chiken, etc., and fish meats such as tunas, bonitos, salmon, etc., drips oozing from the food are absorbed in the inside of the liquid-absorbent sheet 1 through the pores 7 of the liquid-semipermeable film 6, and are spontaneously retained in the capillary liquid-absorbing material 3 and also non-reversibly absorbed and kept in the polymeric water absorbent 2.

The drips oozing from the surface of the food not in contact with the liquid-absorbent sheet 1 go around the back side of the liquid-absorbent sheet 1 and quickly absorbed from the liquid-permeable film 5, whereby the drips do not remain on the surfaces of the food. Also, the drips oozing from the surfaces of the food in contact with the liquid-semipermeable film 6 are absorbed in the inside of the liquid-absorbent sheet 1 through the pores 7 of the liquid-semipermeable film 6. Thus, when the liquid-absorbent sheet 1 is in contact with the surfaces of the food, the drips do not stay in hollow portions of the food.

Then, practical examples of the liquid-absorbent sheet of the present invention and examples for confirming the effects thereof are shown below.

EXAMPLE 1

A liquid-absorbent sheet of the structure as shown in FIG. 1 was prepared. Namely, a pulp sheet having a thickness 10 mm and weighing 400 g/m$^2$ was employed as liquid-absorbent material 4 and a nonwoven polypropylene fabric was laminated as liquid-permeable film 5 onto one face of the pulp liquid-absorbent material. Onto another face of the pulp liquid-absorbent material, was laminated a polyethylene film (TUX-HC30, a product of Tokyo Cellophane K.K.), in which circular pores 7 had been formed at a diameter of 0.04 mm to 1.0 mm and at a porosity of 0.008% to 0.60%, as liquid-semipermeable film 6, to thereby give a liquid-absorbent sheet.

The liquid-semipermeable film face of this liquid-absorbent sheet was brought into contact with meat samples (sirloin (about 7 kg) and round beef (about 10 kg) of a Japanese Holstein; sirloin (about 5 kg) of a Japanese pig), vacuum packaged with a gas-impermeable film and then cold-stored for 10 days. Then the package was opened and the conditions of the stored meat samples were evaluated. Pigments in the food move along with water in the food, and thus the movement of water can be monitored by way of obserbing dolor of the food. The results obtained are shown in Table 1.

TABLE 1

| Porosity (%) | Pore Diameter (mm) | | | | | | | | | |
|---|---|---|---|---|---|---|---|---|---|---|
| | 0.04 | 0.05 | 0.1 | 0.2 | 0.3 | 0.4 | 0.5 | 0.6 | 0.7 | 1.00 |
| 0.008 | x Δ | x Δ | x Δ | x Δ | x Δ | x Δ | x Δ | x * | x * | x * |
| 0.01  | x Δ | o □ | o □ | o □ | o □ | o □ | o □ | x * | x * | x * |
| 0.02  | x Δ | o □ | o □ | o □ | o □ | o □ | o □ | o * | x * | x * |
| 0.05  | x Δ | o □ | o □ | o □ | o □ | o □ | o □ | o * | o * | x * |
| 0.10  | x Δ | o □ | o □ | o □ | o □ | o □ | o □ | o * | o * | x * |
| 0.20  | —   | o □ | o □ | o □ | o □ | o □ | o □ | o * | o * | o * |
| 0.30  | —   | —   | o □ | o □ | o □ | o □ | o □ | o * | o * | o * |
| 0.40  | —   | —   | —   | o □ | o □ | o □ | o □ | o ■ | o * | o * |
| 0.50  | —   | —   | —   | o ■ | o ■ | o ■ | o ■ | o ■ | o ■ | o * |
| 0.60  | —   | —   | —   | o ■ | o ■ | o ■ | o ■ | o ■ | o ■ | o * |

Criteria for evaluation
o: No drip on the surface of the meat.
x: Drips exist on the surface of the meat.
□: The color of the meat is same as that of the surface not in contact with the liquid-absorbent sheet.
■: The color of the meat is clearly faint as compared with that of the surface not in contact with the sheet.
Δ: The color of the meat is clearly blackened as compared with the portion in contact with the sheet.
*: The portions of the meat in contact with the pores are clearly blackened as compared with the surface not in contact with the sheet.

As shown in the results in Table 1, when the pore diameter is not larger than 0.04 mm, since the drips at the contact surface of the liquid-absorbent sheet and the surface of the meat cannot be absorbed into the liquid-absorbent sheet through the pores, the drips remain between the liquid-absorbent sheet and the meat, whereby the surface of the meat is blackened. Also, when the pore diameter is 0.60 mm or larger, the diameter of the pores is too large and hence water in the portions of the meat in contact with the pore portions are adsorbed by the liquid-absorbent sheet together with the drips to cause the concentration of pigments at the portions in contact with the pores, whereby the surface of the meat is spot-like discolored.

In this case, however, when the porosity is increased, the intervals among the pores are narrowed and hence drips and water are absorbed by the liquid-absorbent sheet from the whole surface of the meat in contact with the liquid-absorbent sheet, whereby the color of the surface of the meat becomes wholly faint.

When the porosity becomes lower than 0.008%, since the intervals among the pores are broadened, the drips cannot be introduced into the liquid-absorbent sheet through the pores, whereby the drips remain and are in contact with the meat for a long time and thus the meat is blackened. In this case, however, when the size of the pores becomes large, at the pores and at the peripheral portions of the pores, the drips and water are locally absorbed by the liquid-absorbent sheet, whereby the surface of the meat at the pore is blackened caused by the concentration of pigments to form black spots on the meat surface.

Also, when the porosity becomes higher than 0.5%, the intervals among the pores are narrowed, much water in the food is absorbed by the liquid-absorbent sheet together with the drips and also pigments in the meat are transferred together with water in the meat, whereby the color of the meat becomes faint. However, when the diameter of the pores is large, the local absorption is strong, which causes the concentration of pigments in the meat, whereby the surface of the meat is spot-like blackened at the portions of the pores.

Thus, it has been confirmed that since in the case of using the liquid-absorbent sheet sample wherein the diameter of the pores is in the range of from 0.05 mm to 0.5 mm and the porosity thereof is in the range of from 0.01% to 0.4%, the drips are not remained on the surface of the food and also the food is not discolored, water is not transferred from the food to the liquid-absorbent sheet in this case.

EXAMPLE 2

Three liquid-absorbent sheet samples, which were referred to respectively as liquid-absorbent sheets A, B and C, were prepared.

Liquid-absorbent sheet sample A: A liquid-absorbent sheet having a structure as shown in FIG. 1 wherein liquid-semipermeable film 6 having a diameter of the pores of 0.2 mm and a porosity of 0.1% was used.

Liquid-absorbent sheet sample B: A liquid-absorbent sheet having a structure as shown in FIG. 1 wherein the liquid-semipermeable film was replaced by an unperforated liquid-impermeable film (TUX-HC30, a product of Tokyo Cellophane).

Liquid-absorbent sheet sample C: A liquid-absorbent sheet having a structure as shown in FIG. 1 wherein the liquid-semipermeable film was replaced by a nonwoven polypropylene fabric similar to the liquid-permeable film.

Food sample: The sirloin (about 7 kg) of a Japanese Holstein.

Storage test: The food samples were brought into contact with the liquid-semipermeable film face, the liquid-impermeable film face and the liquid-permeable film face of the liquid-absorbent sheet samples A, B and C, respectively, and then vacuum packaged. After cold-storing for 10-days, each package was opened and the color change in the meat sample and the presence of drips oozing from the food sample onto the contact face were observed. The results obtained are shown in Table 2.

TABLE 2

| Sheet sample | Conditions of meat | Dripping |
| --- | --- | --- |
| A: semipermeable film | No color change both in surface and inside. | No drip. |
| B: impermeable film | Color change in part in contact with the sheet, but no color change in inside. | Drips on part in contact with the sheet. |
| C: double face permeable film | Discoloration in part in contact with the sheet, discoloration and dryness in inside. | No drip. |

It is seen from in Table 2, that when the liquid-absorbent sheet sample A, i.e., an example of the liquid-absorbent sheet according to the present invention, was used, the food could be stored while being free from any discoloration/color change, dryness or dripping.

In contrast, when liquid-absorbent sheet sample B having the liquid-impermeable film in the part to be in contact with the food was used, a large amount of dripps were pooled in the hollow on the surface of the food being in contact with the sheet and also a color change was observed in this part. When liquid-absorbent sheet sample C having a liquid-permeable film in the part to be in contact with the food was used, on the other hand, discoloration/color change occurred in the meat not only at the part being in contact with the liquid-absorbent sheet but also in the inside of the food. In this case, further, the meat was slightly dried, which made it commercially unacceptable.

EXAMPLE 3

Four kinds of liquid-absorbent sheet samples D, E, F, and G were prepared. The size of each liquid-absorbent sheet sample was 10 cm×12 cm.

Liquid-absorbent sheet samples: Each sample was the liquid-absorbent sheet having the structure shown in FIG. 2. Pulp sheets each having a thickness of 1.0 mm and a basis weight of 40 g/m$^2$ was used as the capillary liquid-absorbing materials 3 and 3', and a polyacrylic acid series high water absorbing polymer (Aquaric CA, trade name, made by Nippon Shokubai Kagaku Kogyo Co., Ltd.) was uniformly scattered as the polymeric water absorbent 2 between the capillary liquid-absorbing materials 3 and 3', and sandwiched in the materials in a sheet form to provide a liquid-absorbing material 4.

As shown in Table 3, in the liquid-absorbent sheet sample D, a liquid-semipermeable film having pores 7 each having a diameter of 0.2 mm and having a porosity of 0.04% was used as the liquid-semipermeable film 6 and also a liquid-impermeable film (TUX-HC30, trade name, made by Tokyo Cellophane K.K.) without having pores was used in place of the liquid-permeable film 5. In the liquid-absorbent sheet sample E, a liquid-semipermeable sheet having pores 7 each having a diameter of 0.2 mm and a porosity of 0.04% was used as the liquid-semipermeable sheet 6 and a polypropylene-made nonwoven fabric was used as the liquid-permeable film 5. In the liquid-absorbent sheet sample F, a liquid-impermeable film having no pores was used in place of the liquid-semipermeable film 6 and a polypropylene-made nonwoven fabric was used as the liquid-permeable film 5. In the liquid-absortion sheet sample G, a polypropylene-made nonwoven fabric was used as a liquid-permeable film in place of the liquid-semipermeable film 6 and a liquid-impermeable film having no pores was used in place of the liquid-permeable film 5.

Food sample: Domestic beef (Holstein-Friesian), portion; sirloin (about 7 kg).

Storage test: The same food sample was brought into contact with the surface of the film of each liquid-absorbent sheet sample, the film being shown in Table 3 as the film for contact with food, they are vaccum packaged with a gas-impermeable film, after cold-storing the packaged food for 10 days, the package was opened, and the amount of drips absorbed by each liquid-absorbent sheet sample was measured and the presence of the drips on the contact surface of each liquid-absoption sheet sample and the meat was observed.

The test results are shown in Table 4 below.

TABLE 3

| Liquid-absorbent Sample | Film used for contact with meat | Film used for non-content with meat |
|---|---|---|
| D | Liquid-semipermeable film | Liquid-impermeable film |
| E | Liquid-semipermeable film | Liquid-permeable film |
| F | Liquid-impermeable film | Liquid-permeable film |
| G | Liquid-permeable film | Liquid-impermeable film |

TABLE 4

| Liquid-absorbent sheet sample | Absorbed amount of drip (g) | Presence of drip at contact surface between the sheet and the meat |
|---|---|---|
| D | 8 | none |
| E | 38 | none |
| F | 32 | found |
| G | 42 | none |

From the results shown in Table 4, it can be seen that by comparing the absorbed amunts of the drip between the liquid-absorbent sheet samples D and G, the absorbed amount of drip in the sample D is about 20% of the absorbed amount of the drip in the sample G which shows the liquid-absorbing property as the liquid-semipermeable film. It is also seen from the comparison of the absorbed amounts of the drip between the liquid-absorbent sheet samples E and F, the absorbed amount of the drip in the sample E using the liquid-semipermeable film is about 20% larger than that in the sample F. The drip at the contact surface of the meat and the liquid-absorbent sheet is not obserbed in the sample E, but it is abserved in the sample F. Thus, the function of the liquid-semipermeable film is confirmed.

EXAMPLE 4

The liquid-absorbent sheet having the construction shown in FIG. 1 was prepared.

That is, as the liquid-absorbing material 4, a pulp sheet having a thickness of 10 mm and a basis weight of 400 g/m$^2$ was used and on one surface thereof was laminated a polypropylene-made nonwoven fabric as the liquid-permeable film. Also, on another surface of the liquid-absorbing material 4 was laminated a polyethylene film (TUX-HC30, trade name, made by Tokyo Cellophane K.K.) having formed therein circular pores 7 having a diameter of 0.2 mm and a porosity of 0.1% as the liquid-semipermeable film to provide a liquid-absorbent sheet.

The surface of the liquid-semipermeable film 6 of the liquid-absorbent sheet was brought into contact with each of meats (domestic beef (Holstein-Friesian), portion; sirloin (about 7 kg), round (about 10 kg): domestic pork, portion; sirloin (about 5 kg)], the meat was vacuum packaged in the contacted state, after cold-storing the packaged meat for 10 days, the package was opened, and the state of the meat was observed.

As a result, discoloring of each meat was not observed, and no drip was observed at the contact portion of the meat with the liquid-absorbent sheet.

COMPARATIVE EXAMPLES 1 AND 2

By following the same procedure as in Example 4 except that a liquid-semipermeable film having circular pores 7 having a diameter of 0.01 mm and the porosity of 0.01% was used as the liquid-semipermeable film, the liquid-absorbent sheet of Comaprative Example 1 was prepared.

By following the same procedure as in Example 4 except that a liquid-semipermeable film having circular pores 7 having a diameter of 1.0 mm and the porosity of 1.0% was used as the liquid-semipermeable film, the liquid-absorbent sheet of Comparative Example 2 was prepared.

Using each of the samples prepared in Comparative Examples 1 and 2, the meats were cold-reserved as in Example 4 and then the states of the meats were observed.

In the case of using the sample obtained in Comaprative Example 1, discoloration was observed at the contact portion of each meat and with the liquid-absorbent sheet and also a large amount of drips remained at the portion.

In the case of using the sample obtained in Comparative Example 2, drips were not observed but spot-like discoloration corresponding to the pores was observed at the contact portion of each meat with the liquid-absorbent sheet.

EXAMPLE 5

The liquid-absorbent sheet having the construction shown in FIG. 2 was prepared.

That is, pulp sheets each having a thickness of 1.0 mm and a basis weight of 40 g/m$^2$ were used as the capillary liquid-absorbing materials 3 and 3', and a polyacrylic acid series high water absorbing polymer (Aquaric CA, trade name, made by Nippon Shokubai Kakagu Kogyo Co., Ltd.) was uniformly scattered between these sheets and sandwiched in a sheet form to provide a liquid-absorbing material 4.

On one surface of the liquid-absorbing material 4 was laminated a polypropylene-made nonwoven fabric as the liquid-permeable film 5. Also, on the other surface of the liquid-absorbing material 4 was laminated a polyethylene film (TUX-HC30, trade name, made by Tokyo Cellophane K.K.) having formed therein circular pores 7 having a diameter of 0.2 mm and the porosity of 0.1% as the liquid-semipermeable film 6 to provide a liquid-absorbent sheet.

The surface of the liquid-semipermeable film of the liquid-absorbent sheet 1 was brought into contact with a meat [domestic beef (Holstein-Friesian), portion; sirloin (about 7 kg)], and meat was vacuum packaged with a gas-impermeable film (Battier Back, trade name, made by Grace Co.) in the contact state, after cold-storing the packaged meat for 10 days, the package was opened and the state of the meat was observed.

In this case, any discoloration was not observed on the meat. Also, drips were not observed at the contact portion of the meat with the liquid-absorbent sheet.

After the foregoing test, the liquid-absorbent sheet 1 was took out and when a pressure of 10 kg/cm² was applied thereon, the flow out of drips was not observed. From the result, it can be seen that the use of the polymeric water absorbing material as the liquid-absorbing material is effective for preventing flowing backward of the drips.

EXAMPLE 6

The liquid-absorbent sheet having the construction shown in FIG. 2 was prepared.

That is, thin virgin pulp sheets each having a thickness of 1.0 mm and a basis weight of 40 g/m² were used as the capillary liquid-absorbing materials 3 and 3', and a polyacrylic acid series high water absorbing polymer (Aquaric CA, trade name, made by Nippon Shokubai Kagaku Kogyo Co., Ltd.) was uniformly scattered between the sheets as the polymeric water absorbent 2 and sandwiched in a sheet form to provide a liquid-absorbing material 4.

The liquid-absorbing material 4 was impregnated with 10% by weight food additive glycerol as a wetting agent.

On one surface of the liquid-absorbing material 4 containing the wetting agent was laminated a polypropylene-made nonwoven fabric as the liquid-semipermeable film 6, and on the other surface of the liquid-absorbing material 4 was laminated a polyethylene film (TUX-HC30, trade name, made by Tokyo Cellophane K.K.) having therein pores 7 having a diameter of 0.2 mm and the porosity of 0.1% to provide a liquid-absorbent sheet 1.

The surface of the liquid-semipermeable film 6 of the liquid-absorbent sheet 1 was brought into contact with a meat [domestic beef (Holstein-Friesian), portion; sirloin (about 7 kg)], the meat was vacuum packaged with a gas-impermeable film (Barrier Back, trade name, made by Grace Co.) in the contacted state, and thus 100 packaged samples were prepared. After cold-storing the packaged samples for 10 days, the forming ratio of pinholes in each gas-impermeable film used for the package was measured. The pinhole forming ratio relates to the vacuum during the preservation and is an important factor for keeping foods freshness.

As a results of the measurement, the pinhole forming ratio was 0%. For comparison, when the same test as above was carried out without using the wetting agent, the pinhole forming ratio was 3%. It can be seen that the use of a wetting agent is effective for reducing the pinhole forming ratio of a packaging material.

Since the liquid-absorbent sheet of the present invention contains a liquid-absorbing material and has on the outer surface a liquid-semipermeable film having formed therein pores having a diameter of from 0.05 mm to 0.5 mm and the porosity of from 0.01% to 0.4%, when food is stored in contact with the surface of the liquid-semipermeable film, drips oozing from food such as meat, fish, etc., are absorbed well to prevent the contact surfaces of the food from being discolored and denatured, and since the liquid-absorbent sheet does not absorb water in the food, so that the reduction of weight of the food by drying and lowering of the commercial value of the food is prevented.

Also, since the other surface of the liquid-absorbent sheet is composed of a liquid-permeable film, a large amount of drips and water at thawing are quickly absorbed from the surface, whereby the occurrence of denaturing of food is prevented.

When the liquid-absorbing material contains a polymeric water absorbent, since the polymeric water absorbent quickly absorbs a large amount of drips and non-reversibly keeps the drips to an external pressure, the drips are always smoothly absorbed during the storage and transportion of food and also the drips absorbed do not flow back to the food side.

When the liquid-absorbing material contains a wetting agent, since the wetting agent strengthens the suction force of the liquid-absorbing material for drips and softens the liquid-absorbing material, the pinhole forming ratio of the packaging material is lowered and the freshness of the food can be surely maintained.

The liquid-absorbent sheet of the present invention having the advantages as described above can be effectively used for the storage of drippy foods, such as meat, fish, etc., and can not only keep the quality and the yield high in the case of vacuum packaging the food and transporting or storing but also in the case of opening the package and cooking or selling by placing the food on a shop front, when the liquid-absorbent sheet is laid, the freshness keeping period of time or the relishing time can be prolonged.

While the invention has been described in detail and with reference to specific embodiments thereof, it will be apparent to one skilled in the art that various changes and modifications can be made therein without departing from the spirit and scope thereof.

What is claimed is:

1. A method for storing foods, which comprises
   (i) providing a liquid-absorbent sheet containing a liquid-absorbing material capable of absorbing drips of food, wherein a part of one outer surface of the liquid-absorbent sheet is composed of a liquid-permeable film, a part of the other outer surface thereof is composed of a liquid-semipermeable film, the liquid-semipermeable film is a liquid-impermeable film having formed therein pores, the diameter of each of the pores is in the range of from 0.05 mm to 0.5 mm, and the porosity of the pores is in the range of from 0.01% to 0.4%,
   (ii) contacting the food with the surface of the liquid-semipermeable film of the liquid-absorbent sheet, and
   (iii) vacuum packaging the food and the liquid-absorbent sheet together using a gas-impermeable film.

2. A method for storing foods as in claim 1, wherein the diameter of the pores of the liquid-semipermeable film formed is in the range of from 0.1 mm to 0.3 mm and the porosity thereof is in the range of from 0.01% to 0.2%.

3. A method for storing foods as in claim 1, wherein the liquid-semipermeable film is a polyethylene film or a polypropylene film having formed therein pores.

4. A method for storing foods as in claim 1, wherein the liquid-absorbing material contains a polymeric water absorbent.

5. A method for storing foods as in claim 1, wherein the liquid-absorbing material contains at least one wetting agent selected from the group consisting of ethylene glycol, propylene glycol, diethylene glycol monoethyl ether, 1,3-butylene glycol, glycerol, polyethylene glycol, polypropylene glycol, polyglycerol, xylitol, sorbitol, maltitol, methyl cellulose, and carboxymethyl cellulose.

6. A method for storing foods as in claim 1, wherein the liquid-absorbing material has a polymeric water absorbent sandwiched in a sheet form with capillary liquid absorbing materials, and contains a wetting agent, said liquid-absorbing material is sandwiched between the liquid permeable film and the liquid semipermeable film, and both the films are heat-sealed at the peripheral portions thereof.

* * * * *